United States Patent [19]
Fleischmann

[11] Patent Number: 5,926,511
[45] Date of Patent: Jul. 20, 1999

[54] PROCESS FOR THE COHERENT DEMODULATION OF A RECEPTION SIGNAL

[75] Inventor: Michael Fleischmann, München, Germany

[73] Assignee: Ascom Tech AG, Bern, Switzerland

[21] Appl. No.: 08/803,638

[22] Filed: Feb. 21, 1997

[30] Foreign Application Priority Data

Feb. 23, 1996 [CH] Switzerland ............................ 00477/96

[51] Int. Cl.$^6$ .............................. H03D 1/00; H04L 27/06; H03H 7/30; H03H 7/40
[52] U.S. Cl. ........................ 375/341; 375/340; 375/233; 375/232; 375/231; 375/230; 375/229
[58] Field of Search ................................. 375/340, 341, 375/229, 230, 231, 232, 233

[56] References Cited

U.S. PATENT DOCUMENTS

| | | | |
|---|---|---|---|
| 5,353,307 | 10/1994 | Lester et al. ............................. | 375/233 |
| 5,471,501 | 11/1995 | Parr et al. ................................ | 375/354 |
| 5,513,215 | 4/1996 | Marchetto et al. ...................... | 375/233 |
| 5,621,769 | 4/1997 | Wan et al. ............................... | 375/347 |
| 5,673,288 | 9/1997 | Okanoue ................................. | 375/231 |
| 5,748,415 | 5/1998 | Chevillat et al. ........................ | 375/341 |

*Primary Examiner*—Stephen Chin
*Assistant Examiner*—Michael W. Maddox

[57] ABSTRACT

In a process for the coherent demodulation of a reception signal, several coefficients of the channel impulse response are determined beforehand. The coefficients are divided into at least two gain taps and at least one loss tap. The loss taps are utilized for a feedback filter to eliminate a corresponding signal component. The signal cleared up in this manner is estimated in a log-likelihood equalizer on the basis of gain taps. The process is characterized in that neither filter training nor high mathematical effort are required for determining the equalizer coefficients. There is also no error floor for the high frequency band signal. The quantity of operations required per symbol in the detection phase is comparatively small.

11 Claims, 4 Drawing Sheets

PROCESS FOR THE COHERENT DEMODULATION OF A RECEPTION SIGNAL

BACKGROUND OF THE INVENTION

1. Field of the Invention

The invention concerns a process for the coherent demodulation of a reception signal wherein several coefficients of a channel impulse response are determined beforehand. The invention further concerns a switching device for carrying out the process.

2. Description of the Background Art

Higher frequency bands must be selected for the new uses of wireless communication. Therefore, for indoor data communication, for example, frequency carriers of 5 gigahertz (HYPERLAN standard) are provided. Due to the multiple branching (multi-path propagation), a signal distortion corrector is unavoidable on the side of the receiver. With a symbol duration of T=42.5 ns (HYPERLAN), for example, and a typical delay spread of DS=150 ns, the channel impulse response can extend over several symbol intervals. This can lead to serious inter-symbol interference (ISI) when the signal is received. It will require a correspondingly effective distortion correction. Additional inter-symbol interference occurs with the use of GMSK modulation with a time-bandwidth product of BT=0.3 (for example in HYPERLAN) due to partial response signaling.

An optimum MLSE distortion correction cannot be obtained with a data rate of 1/T=23.5 Mbit/s (Viterbi logarithm) due to the high complexity (amount of calculation operations per second, performance requirement).

The DFE structure (DFE=decision feedback equalizer; compare with J. G. Proakis, Digital Communications, McGraw-Hill Book Company 1989, 2nd edition, pages 593 and following) is naturally also known. However, the same causes the problem of the error floor so that a performance at higher signal-to-noise ratio is limited.

SUMMARY OF THE INVENTION

The object of the invention is to provide a process of the kind described above that is suitable for indoor data transmission, whereby good distortion correction with lower complexity of the receiver is sought.

According to the invention, the solution consists in that at least two coefficients are used as gain taps in a log-likelihood equalizer and at least one coefficient is used as a loss tap in a feedback filter.

A definite advantage of the process according to the invention consists in that even with high SNR, no so called error floor is present. That is, the performance can always be improved by means of a reduction of the noise. It should be further noted that with the invention, no filter training is needed to determine the equalizer coefficients in the initialization phase. The number of calculation operations per detected symbol is also considerably low.

The invention takes advantage of the fact that the energy is distributed unevenly in a channel impulse response with several taps. The first two or three taps, for example, are often much stronger than the rest. According to the invention, only the so-called gain taps are used for the extraction of useful information from the reception signal. The loss taps (afterrunner) are classified as disturbances and are eliminated by means of the feedback filter without using the part (also contained in the afterrunners) with the useful information. The feedback filter represents a feedback of the already estimated symbols. The influence of the loss taps with the feedback filter can be completely eliminated when there are no decision errors.

The estimation of the coefficients of the channel impulse response can our in a known manner (for example, by evaluation of an already known training sequence contained in each burst—HYPERLAN standard is taken into consideration). The estimation for a channel can be carried again for each burst when there is burst transmission. Correspondingly, the coefficients and the dimensions depending therefrom that are in the feedback filter or in the log-likelihood equalizer can be calculated anew.

The cleared-up reception signal and the already estimated symbols are combined in two or more separate paths in the log-likelihood equalizer. The L values $L_i$ (probability values) are then formed (soft decision). The L values are summed up (added) and guided to a decider that estimates the actual symbol on the basis of a hard decision.

The calculation work necessary for carrying out the invention can generally be divided into an initialization and a detection phase. In the initialization phase, all the calculations carried out are those that must be carried out again for detecting a burst. In the detection phase, the actual useful data (symbol estimated values) are determined.

According to a preferred embodiment, an actual signal constellation $\{x^+_{k,i}, S^-_{k,i}\}$ is calculated according to equations II and III to determine the L values $L_i$ on the basis of a distancing function between a reception signal and the signal constellation. The distancing function can be formulated in different ways according to the desired bit error rate and the available addition performance. According to a first embodiment variant, the weighting values $w_i$ are determined in the initialization phase according to equation IV. The values $L_i$ are calculated in the detection phase, on the basis of a particularly simple model of the distancing function, according to equation V.

A table is determined in the initialization phase according to equations VI and VII, according to a second embodiment that is more complicated mathematically and which makes it possible to determine the values $L_i$ according to equations VIII, IX, and X. It should be noted that the mathematical effort is relatively small during the detection phase. Only the initialization phase is somewhat complicated.

The values $L_i$ can be determined, according to a third embodiment, according to equations XI to XIV in the detection phase to achieve an even better performance.

In the fourth embodiment, the distancing function is set up in such a manner that a minimum Euclidean distance is determined between the reception signal and the actual signal constellation in the complex plane. The embodiment of the above-enumerated variants (Directives XV–XVIII) is undoubtedly the more complicated mathematically and the best in performance.

The mathematical effort does not depend only upon the selected distancing function, but also upon the quantity of gain taps. The work is typically carried out with 2 to 5 gain taps. The quantity of loss taps does not have a great influence on the mathematical effort. The loss taps can be utilized directly as coefficients for the feedback filter.

If the leading channel coefficients (leading taps) are small (for example, smaller than the largest coefficient of the afterrunner, that is, of the loss taps), then the optimum observation window (gain tap window) can be moved to higher indices (also backwards). For the laying down of the observation window, the sum of the eye openings is calculated and maximized with regard to all the possible positions of the observation window.

The invention is suitable particularly for data communication according to the HYPERLAN standard. A switching device for implementing the process of the invention has a feedback filter for eliminating signal components generated by the loss taps out of the reception signal, and a log-likelihood equalizer to estimate the data (symbols) on the basis of gain taps. The mathematically simple first-mentioned embodiment can be particularly well implemented with an ASIC. The complete switching device is, for example, integrated into a plug-in module for a personal computer, a laptop, etc.

Further advantageous examples of embodiments and feature combinations result from the following detailed description.

BRIEF DESCRIPTION OF THE DRAWINGS

The invention will be described further with reference to the drawings, which are given by way of illustration only, and thus are not limitative, and wherein.

WAYS FOR REALIZING THE INVENTION

Figure 1:
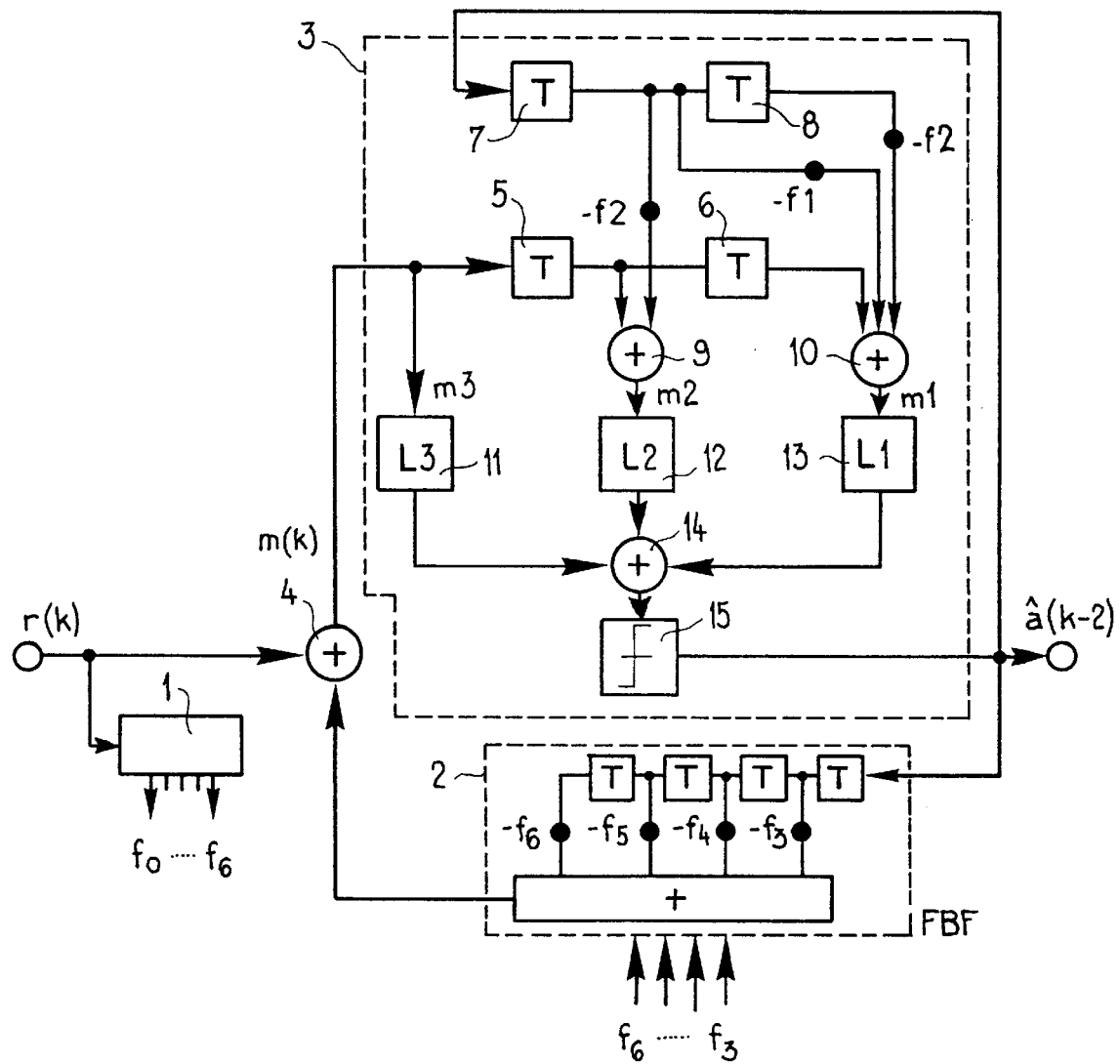
FIG. 1 is a block circuit diagram of a coherent demodulator according to the invention.

FIG. 1 roughly shows the structure of a receiver including baseband components. r(k) represents a complex reception signal (after mixing, for example, with a gigahertz region, frequency band signal). For example, the seven complex coefficients $f_0$ to $f_6$ of the channel impulse response are determined by means of a channel estimator 1 according to a suitable process. These seven coefficients $f_0$ to $f_6$ are divided, for example, into three gain taps $f_0$ to $f_2$ and four loss taps $f_3$ to $f_6$.

The loss taps $f_3$ to $f_6$ are used as coefficients in a feedback filter 2. The gain taps $f_0$ to $f_2$ are utilized for the determination of the symbol estimated values in the log-likelihood equalizer 3, for short LLE.

The reception signal r(k) is combined with a value estimating signal that is guided back by means of the feedback filter 2 (adder 4) and is guided to the LLE 3 as a cleared-up reception signal m(k).

A separation into three processing paths occurs in the LLE 3. In the first path, the value L3 (which will be explained below) is calculated directly from the m(k) (compare with formula Ia).

In a second path, a delay (delay element 5) by a symbol duration T is first inserted. Then a sum (adder 9) is combined with the last estimate and the symbol estimated value â(k-3) is weighted with the coefficient $-f_2$ (compare with formula Ib).

For the third path, a cleared-up reception signal m(k) is delayed a second time by a symbol duration T (delay element 6) and is combined with the corresponding delay (7, 8) and the symbol estimated values â(k-3) and â(k-4) weighted with respective coefficients $-f_1$ and $-f_2$ according to the formula Ic (adder 10).

The three paths are combined in an adder 14 after being output by L-value calculators 11, 12, 13. Thereafter, a decider 15 determines the symbol estimated value â(k-2) according to a hard decision.

The four preferred variants for determining the L values are described in the following with respect to the binary modulation. The signal constellation must be first determined in the initialization phase according to formula II in all four variants. For i=3, for example, the following results:

$$x^+_{1,1} = +f_0 \qquad x^-_{1,1} = -f_0$$
$$x^+_{1,2} = +f_1 + f_0 \qquad x^-_{1,2} = -f_1 + f_0$$
$$x^+_{2,2} = +f_1 - f_0 \qquad x^-_{2,2} = -f_1 - f_0$$
$$x^+_{1,3} = +f_2 + f_2 + f_0 \quad x^-_{1,3} = -f_2 + f_1 + f_0$$
$$x^+_{2,3} = +f_2 + f_1 - f_0 \quad x^-_{2,3} = -f_2 + f_1 - f_0$$
$$x^+_{3,3} = +f_2 - f_1 + f_0 \quad x^-_{3,3} = -f_2 - f_1 + f_0$$
$$x^+_{4,3} = +f_2 - f_1 - f_0 \quad x^-_{4,3} = -f_2 - f_1 - f_0$$

In the especially preferred first embodiment, the weighting factors $w_i$ are also measured in the initialization phase according to formula IV. $\text{Arg}(f_{i-1})$ represents the argument of the complex value coefficients $f_{i-1}$. $rx^+_{k,i}$ stands for the real value of the complex value dimensions $x^+_{k,i}$. The signal point with the lowest absolute value is also sought and rotated with respect to a phase within the initialization phase.

The values $L_i$ are determined during the detection phase according to formula V. In theory, the worst case scenario is taken into consideration for this variant. This means that the result is then identical with an optimum calculation if the signal point $rx^+_{k,i}$ or $rx^-_{k,i}$ appears with its smallest absolute value. The value $L_i$ is pessimistic in all the other cases.

Figure 4:
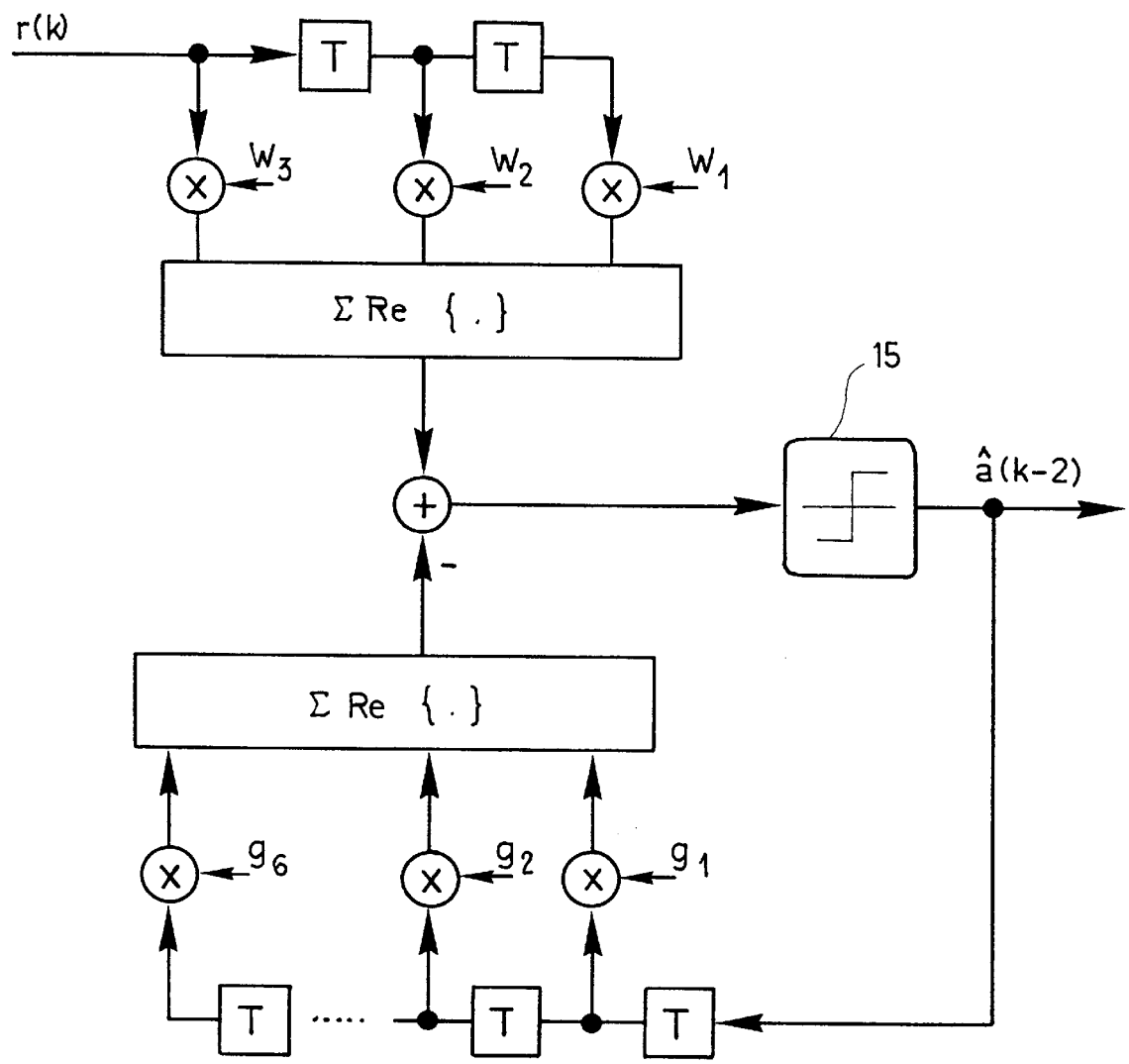
FIG. 4 is a block circuit diagram of an especially preferred embodiment.

In the embodiment just described, the general block circuit diagram is simplified according to FIG. 1 into the one shown in FIG. 4. As the expert can easily recognize, this structure looks like the one of a DFE. The fundamental difference consists in how the coefficients are calculated. In this connection, the invention differs clearly from the known DFE receivers. The following should also be mentioned: while the coefficients can also be zero, this is never the case with the known DFE coefficients.

In the case of a binary modulation, for example, the feedback coefficients $g_1, g_2, g_3, g_4, g_5, g_6$ are calculated as follows:

$$g_1 = f_3 * w_3 + f_2 * w_2 + f_1 * w_1$$
$$g_2 = f_4 * w_3 + f_3 * w_2 + f_2 * w_1$$
$$g_3 = f_5 * w_3 + f_4 * w_2 + f_3 * w_1$$
$$g_4 = f_6 * w_3 + f_5 * w_2 + f_4 * w_1$$
$$g_5 = \qquad\qquad f_6 * s_2 + f_5 * w_1$$
$$g_6 = \qquad\qquad\qquad\qquad f_6 * w_1$$

The values L1, L2, and L3 correspond in this case to the products $r(k)*w_3$ or $r(k-2)*w_1$ (feed forward filter).

The second preferred embodiment relies on the fact that a table must be calculated in the initialization phase which must only be selected in the detection phase. The somewhat increased requirement for calculations in the initialization phase is compensated by an improvement in performance. The values of the table $TAB_{PDF,i(z)}$ are calculated according to formulas VI and VII during the initialization phase. $ramsp_i$ designates the dimension (to be set before construction) of the ith table.

The real-value dimensions $rm_i$, the address adr, and the values $L_i$ are determined in the detection phase according to formulas VIII to X. A backward rotation and an address calculation for the stored table (lookup table) are essentially carried out.

The performance of the both embodiments described in the following can be improved with respect to the previous embodiments. However, the detection phase is considerably more effort consuming, while a minimum is actually being sought.

In the third embodiment, the initialization phase is limited to the determination of the signal constellation according to formulas II and III. Instead, the detection phase requires the use of formulas M to XIV.

From the performance point of view, the fourth preferred embodiment is the closest to the optimum, but mathematically it is very consuming. Unlike the third embodiment, the fourth embodiment works on the complex decision plane. This means that minimal distances (Euclidean distances) need to be determined. The complex value signal constellation is determined in the initialization phase according to formula II. The values $L_i$ are then determined in the detection phase per symbol interval according to formulas XV to XVII.

Figure 2:
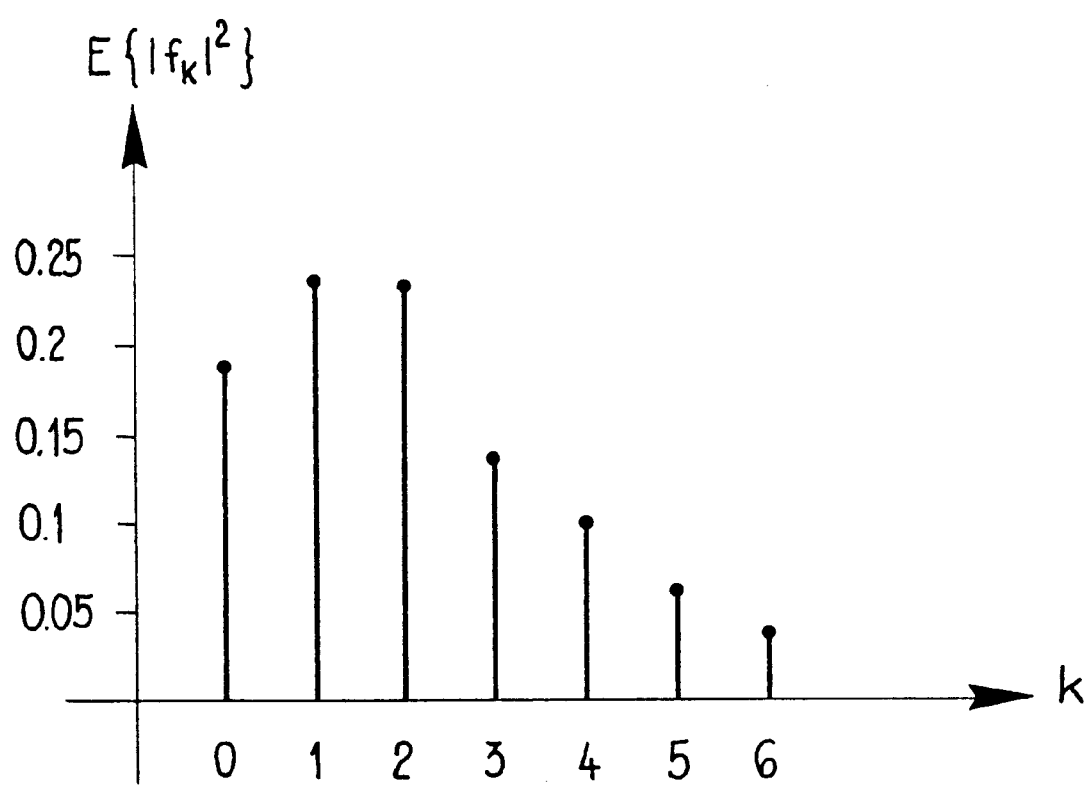
FIG. 2 is an example of a possible energy distribution on the different coefficients of the channel impulse response.
Figure 3:
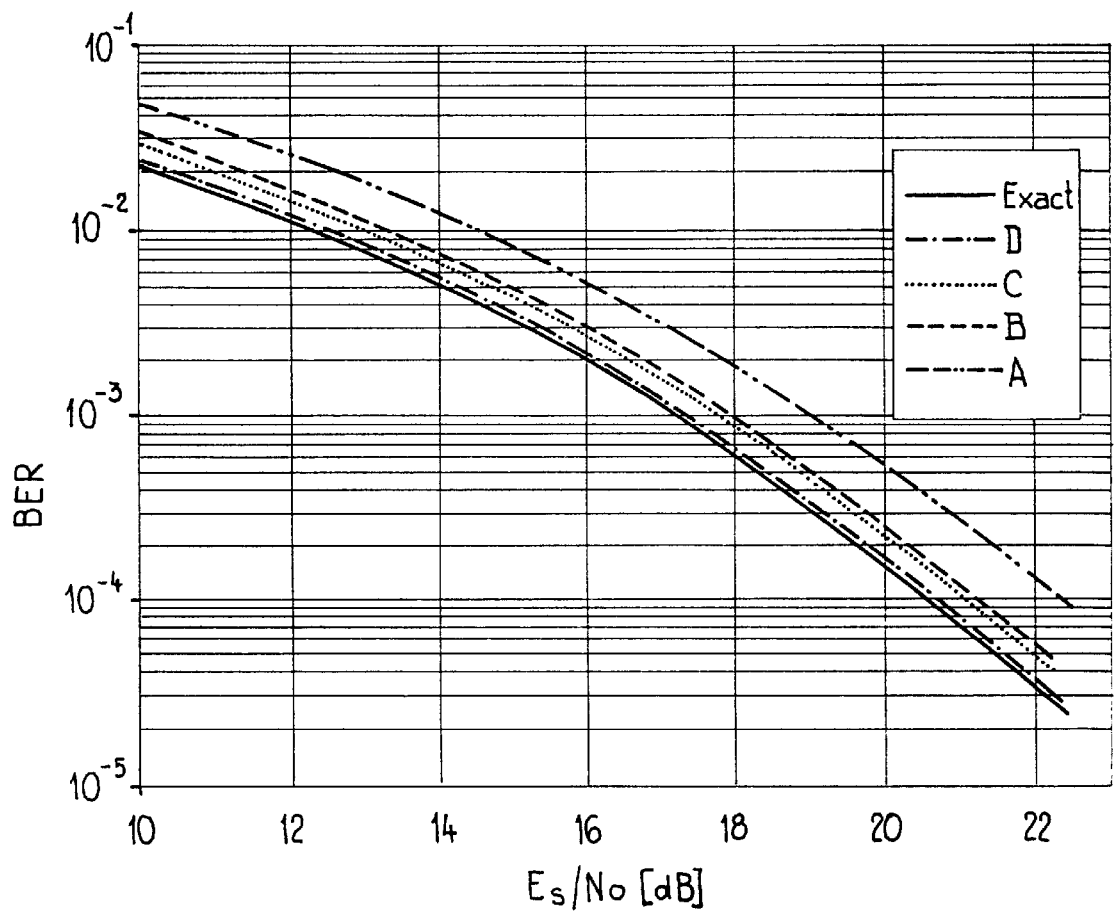
FIG. 3 is a graphic representation of the simulation results of four preferred embodiments.

FIG. 3 compares the performance of the different embodiments. The simulations are carried out on the basis of a BPSK signal and a data burst with 10 blocks, each having a block length of 496 bit. A Rayleigh-Fading channel was laid out with seven coefficients (taps) at an interval T. The channel coefficients were taken up as time invariants within the data bursts, but are also statistically independent from one burst to the other. A mean performance per tap was taken up according to FIG. 2.

The signal-to-noise ratio is represented on the abscissa and the bit error rate (BER) is represented on the ordinal. As can be seen in FIG. 3, the fourth embodiment D has almost the same performance as the optimum LLE receiver structure (exact). The performance diminishes by 0.5 dB if the work is carried out, according to the third embodiment C, on the real axis instead of the complex plane. According to performance, the second and third embodiments (curve B or C) are very close. A further reduction of about 1.5 dB is particularly easy to obtain mathematically in the first more simple embodiment (curve A). Even so, this variant has also the advantage that the bit error rate decreases constantly with an increasing signal-to-noise ratio and does not become flat. A table dimension of $ramsp_i=32$ was selected in the simulation of the second embodiment.

In cases wherein the leading taps of the channel impulse response are small (for example, due to synchronization delay), it is an advantage if the gain taps are moved "to the back" toward the channel coefficients that have a stronger performance. This means that the first tap of the channel impulse response is not taken into consideration and the interference is tolerated up to a certain degree (presupposing that the eye opening of the remaining gain taps is sufficiently large). According to a preferred embodiment, the I gain taps are fixed in such a manner that the sum of the squared eye openings $eo_i$ is maximal. The optimum of the indices pos that is being sought is mathematically retained in formula XVIII. K+1 is the quantity of taps or coefficients calculated at the channel estimation. The values $eo_i$ are calculated in the initialization phase according to formula XIX. The values $rx^+_{j,i}$ and $rx^-_{j,i}$ result when calculating the signal constellation according to formulas II and III.

No noticeable mathematical effort is generated in the first-mentioned embodiment where $eo_i=|w_i|$ for $1 \leq i \leq I$. Additional calculations are required for the other embodiments.

The invention is, of course, not limited to the four described embodiments. Modifications for the sake of simplification of the calculation effort or for the improvement of the performance are also possible.

The receiver structure allows for a good performance with limited complexity. It is suitable, therefore, for the implementation of an ASIC. Unlike, for example, a DFE (decision feedback equalizer), there is no flattening (error floor) of the bit error rate even with higher signal-to-noise ratio. The initialization phase is performed without training or matrix calculation. The mathematical effort is also comparatively small in the detection phase (in comparison with that of a DFE with corresponding complexity, for example).

Formulas (a) $m_3 = m(k)$ (b) $m_2 = m(k-1) - f_2 * \partial(k-3)$ (c) $m_1 = m(k-2) - f_1 * \partial(k-3) - f_2 * \partial(k-4)$ (I)

$I_{k,i}^+ = +f_{i-1} \pm f_{i-2} \pm f_0 1 \leq k \leq 2^{i-1}$ $I_{k,i}^- = +f_{i-1} \pm f_{i-2} \pm f_0 1 \leq k \leq 2^{i-1}$ (II)

$TI_{k,i}^+ = \text{real}\{exp(-j*arg(f_{i-1}))*I_{k,i}^+\}$ $TI_{k,i}^- = \text{real}\{exp(-j*arg(f_{i-1}))*I_{k,i}^+\}$ (III)

$w_i = \min_k [rx_{k,i}^+] * \exp(-j * \arg(f_{i-1}))$ for $\min_k [rx_{k,i}^+] > 0$ (IV)

$w_i = 0$ else $L_i = \text{real}\{m_i * w_i\}$ (V)

$$\Delta_i = \frac{ramsp_i}{2 * \max_k [rx_{k,i}^+]}$$ (VI)

$$TAB_{PDF,i}(z) = \log \left[ \frac{\sum_{k=1}^{2^{i-1}} \exp\left(\frac{-(x/\Delta_i - rx_{k,i}^+)^2}{2\sigma^2}\right)}{\sum_{k=1}^{2^{i-1}} \exp\left(\frac{-(x/\Delta_i - rx_{k,i}^-)^2}{2\sigma^2}\right)} \right]$$ (VII)

$rm_i = \text{real}\{exp(-j*arg(f_{i-1}))*m_i\}$ (VIII)

$adr = \text{Integer}(rm_i * \Delta_i)$ (IX)

$L_i = TAB_{PDFi}(adr)$ (X)

$rm_i = \text{real}\{exp(-j \, arg(f_{n-i}))*m_i\}$ (XI)

$mindist_i^+ = \min_k [|rm_i - rx_{k,i}^+|]$ (XII)

$mindist_i^- = \min_k [|rm_i - rx_{k,i}^-|]$ (XIII)

$L_i = (mindist_i^-)^2 - (mindist_i^+)^2$ (XIV)

$(mindist_i^+)^2 = \min_k [|m_i - x_{k,i}^+|^2]$ (XV)

$(mindist_i^-)^2 = \min_k [|m_i - x_{k,i}^-|^2]$ (XVI)

$L_i = (mindist_i^-)^2 - (mindist_i^+)^2$ (XVII)

$$\max_{pos}\left(\sum_{i=pos}^{l+pos-1}(eo_i)\right) \quad (0 \leq pos \leq K-l+1) \qquad \text{(XVIII)}$$

$$eo_i = 0.5 * \min_{k,j}[\,|\,rx^+_{k,i} - rx^-_{j,i}\,|\,] \qquad \text{(XIX)}$$

I claim:

1. A process for coherent demodulation of a reception signal comprising the steps of:
   a) calculating coefficients of a channel impulse response;
   b) separating the coefficients into at least two gain tap coefficients and at least one loss tap coefficient;
   c) combining the reception signal with an estimated signal to generate a cleared-up reception signal, the estimated signal being provided for combining via a feedback filter;
   d) using the at least one loss tap coefficient in the feedback filter so that influences of loss taps are eliminated in the cleared-up reception signal;
   e) providing the cleared-up reception signal to a log-likelihood equalizer having separated paths each including a likelihood value calculator;
   f) extracting useful information and generating the estimated signal from the cleared-up reception signal using the at least two gain tap coefficients in the log-likelihood equalizer;
   g) determining an actual signal constellation $X^+_{k,i}, X^-_{k,i}$ in the log-likelihood equalizer during an initialization phase of demodulation as $$X^+_{k,i} = +f_{i-1} \pm f_{i-2} \pm \ldots \pm f_0, \text{ and}$$
   $$X^-_{k,i} = +f_{i-1} \pm f_{i-2} \pm \ldots \pm f_0,$$

wherein $1 \leq k \leq 2^{i-1}$ and $f_i$ are gain tap coefficients of the channel impulse response; and
   h) determining likelihood values $L_i$ for each separated path on the basis of a distancing function between the reception signal and the actual signal constellation determined in said step g).

2. The process for coherent demodulation of claim 1, wherein said step b) comprises selecting the at least two gain tap coefficients from the coefficients so that a sum of values of eye openings of the reception signal is a maximum.

3. The process for coherent demodulation of claim 2, comprising the further steps of:
   i) combining in the log-likelihood equalizer the cleared-up reception signal with already present symbols of the estimated signal;
   j) providing respective combined values mi determined in said step i) for the separated paths; and
   k) determining actual symbols of the estimated signal by hard decision in accordance with likelihood values determined in the separated paths in accordance with the respective combined values.

4. The process for coherent demodulation of claim 3, wherein weighting values $w_i$ are determined in the initialization phase as $$w_i = \min_k\{rx^+_{k,i}\} * \exp(-j*\arg(f_{i-1})) \text{ for } \min_k\{rx^+_{k,i}\} > 0, \text{ and}$$

$w_i = 0$ otherwise, wherein $rx^+_{k,i} = \text{real}\{exp(-j*arg(f_{i-1}))* x^+_{k,i}\}$, and $rx^-_{k,i} = \text{real}\{exp(-j*arg(f_{i-1}))* x^-_{k,i}\}$, and the likelihood values $L_i$ are then calculated for each separated path in a detection phase as $L_i = \text{real}\{m_i + w_i\}$, $\arg(f_{i-1})$ representing the argument of complex value coefficients $f_{i-1}$.

5. The process for coherent demodulation of claim 3; wherein a table is calculated in the initialization phase such that $$\Delta_i = \frac{ramsp_i}{2*\max_k[rx^+_{k,i}]}, \text{ and}$$

$$TAB_{PDF_i}(z) = \log\left(\frac{\sum_{k=1}^{2^{i-1}}\exp\left(\frac{-(x/\Delta_i - rx^+_{k,i})^2}{2\sigma^2}\right)}{\sum_{k=1}^{2^{i-1}}\exp\left(\frac{-(x/\Delta_i - rx^-_{k,i})^2}{2\sigma^2}\right)}\right),$$

the likelihood values $L_i$ being determined as $rm_1 = \text{real}\{exp(-j*arg(f_{i-1}))*m_i\}$, $adr = \text{Integer}(rm_i*\alpha_i)$ and $L_i = TAB_{PDFi}(adr)$, wherein $rx^+_{k,i} = \text{real}\{exp(-j*arg(f_{i-1}))*x^{+hd\,k,i}\}$, and $rx^-_{k,i} = \text{real}\{exp(-j*arg(f_{i-1}))*x^-_{k,i}\}$, $\arg(f_{i-1})$ representing the argument of complex value coefficients $f_{i-1}$ and $ramsp_i$ representing dimensions of an ith table.

6. The process for coherent demodulation of claim 3, wherein the actual signal constellation is determined in the initialization phase in accordance with $rx^+_{k,i} = \text{real}\{exp(-j*arg(f_{i-1}))*x^+_{k,i}\}$, and $rx^-_{k,i} = \text{real}\{exp(-j*arg(f_{i-1}))*x^-_{k,i}\}$, $\arg(f_{i-1})$ representing the argument of complex value coefficients $f_{i-1}$, the likelihood values $L_i$ being determined in a detection phase as follows:

$$rm_i = \text{real}\{\exp(-j*\arg(f_{i-1}))*m_i\},$$

$$\min dist^+_i = \min_k[\,|\,rm_i - rx^+_{k,i}\,|\,],$$

$$\min dist^-_i = \min_k[\,|\,rm_i - rx^+_{k,i}\,|\,], \text{ and}$$

$$L_i = (\min dist^-_i)^2 - (\min dist^+_i)^2.$$

7. The process for coherent demodulation of claim 1, wherein a maximum of 6 gain tap coefficients are determined in said step b).

8. The process for coherent demodulation of claim 7, wherein two gain tap coefficients are determined in said step b).

9. The process for coherent demodulation of claim 1, wherein a minimum Euclidean distance is determined based on the distancing function between the cleared-up reception signal and the actual signal constellation.

10. An apparatus for coherent demodulation of a reception signal comprising:

channel estimation means for calculating coefficients of a channel impulse response;

separation means for separating the coefficients into at least two gain tap coefficients and at least one loss tap coefficient;

feedback filter means for filtering an estimated signal using the at least one loss tap coefficient and for combining the filtered estimated signal with the reception signal to provide a cleared-up reception signal, the at least one loss tap coefficient used by said feedback filter means eliminating influences of loss taps in the cleared-up reception signal;

a log-likelihood equalizer having separated paths for extracting useful information and generating the estimated signal from the cleared-up reception signal using the at least two gain tap coefficients; and signal constellation means for determining an actual signal constellation $\{x+_{k,i}, x^{31}{}_{k,i}\}$ during an initialization phase as $$x^+_{k,i} = f_{i-l} \pm \ldots \pm fO, \text{ and}$$

$$x^-_{k,i} = f_{i-l} \pm \ldots \pm fO,$$

wherein $1 \leq k \leq 2^{i-l}$ and $f_i$ are gain tap coefficients of the channel impulse response, said log-likelihood equalizer determining likelihood values $L_i$ for each separated path on the basis of a distancing function between the cleared-up reception signal and the actual signal constellation.

11. The apparatus for coherent demodulation of claim 10, wherein said log-likelihood equalizer has a structure of a feedforward filter comprising means for calculating filter coefficients as $$w_i = \min_k \{rx^+_{k,i}\} * \exp(-j * \arg(f_{i-1})) \text{ for } \min_k \{rx^+_{k,i}\} > 0, \text{ and}$$

$$w_i = 0 \text{ otherwise,}$$

$\arg(f_{i-l})$ representing the argument of complex value coefficients $f_{i-l}$.

* * * * *